United States Patent Office 3,322,552
Patented May 30, 1967

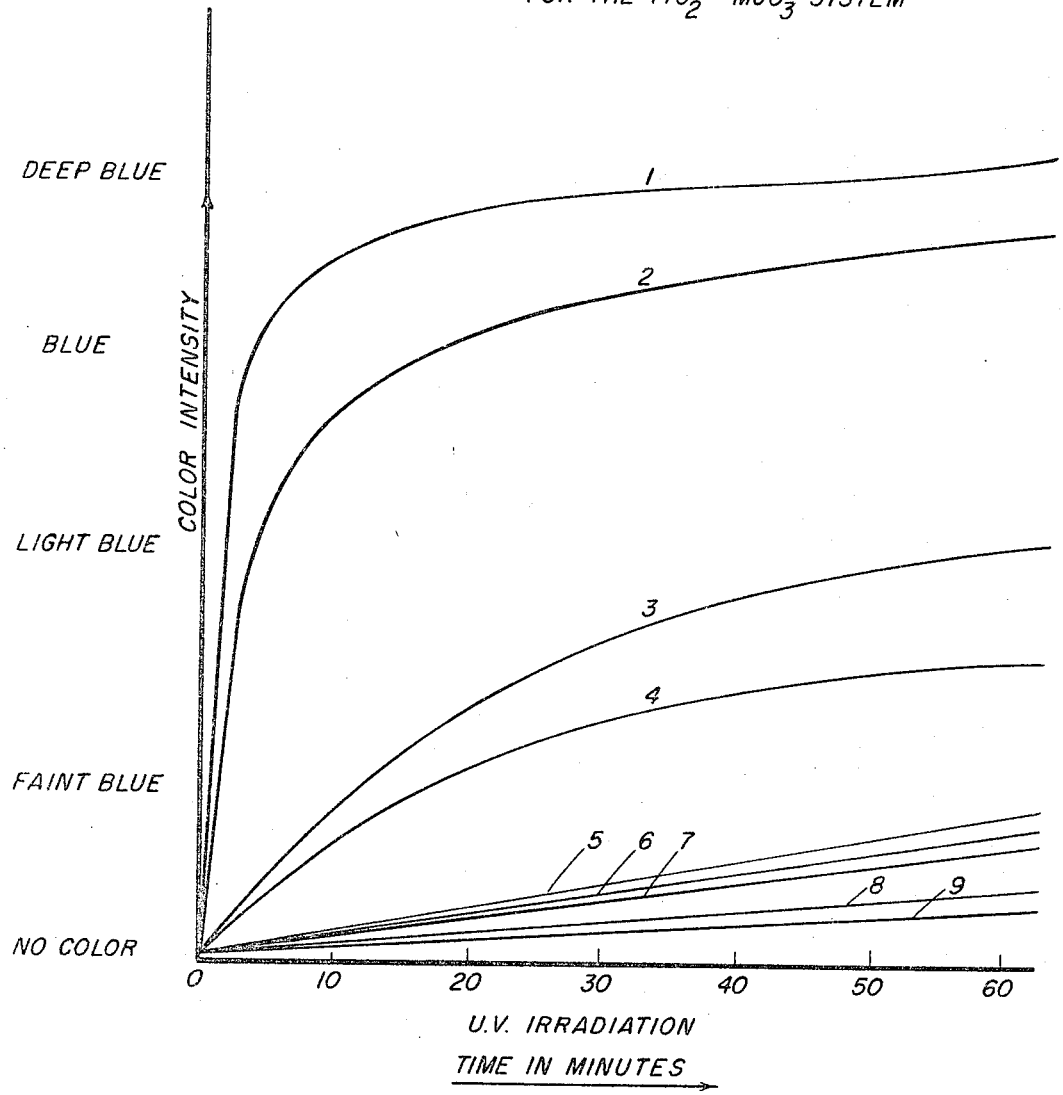

3,322,552
INORGANIC PHOTOCHROMIC MATERIALS AND PROCESS FOR PRODUCING SAME
George L. Roberts, Jr., Lynchburg, Va., and John A. Chopoorian, Stamford, Conn., assignors to American Cyanamid Company, Stamford, Conn., a corporation of Maine
Filed Nov. 21, 1962, Ser. No. 239,159
6 Claims. (Cl. 106—288)

This invention relates to a novel process for the production of photochromic oxides. More particularly, this invention relates to a novel process for the production of photochromic inorganic oxides wherein various primary metal oxides are reacted with secondary or activating metal oxides, halides, sulfates or nitrates and to the products produced thereby. Still more particularly, this invention relates to a novel process for the production of photochromic inorganic oxides which comprises reacting (1) an aqueous alkaline solution of a compound having the formula (I) $YO_3$ or (II) $X_2YO_4$ wherein Y is Mo or W and X is an alkali metal, or $NH_4^+$, with (2) a halide, oxide, hydrous oxide, sulfate or nitrate of Ti, Ge, Nb, Zr, Sn, Ce or Zn, in water, at a pH of less than about 7.0 and at a temperature ranging from about 50° C. to about 100° C. and recovering the resultant reaction product. Still more particularly, this invention relates to a novel group of compounds comprising two component reaction products produced by reacting (1) a compound having the formula $YO_3$ or $X_2YO_4$, wherein X and Y are as defined above, with (2) a halide, oxide, hydrous oxide, sulfate or nitrate of Ti, Ge, Nb, Zr, Sn, Ce or Zn, said products possessing the ability to markedly change color when subjected to ultraviolet light and to return to their original color upon removal of the light source.

The use of inorganic oxides as ordinary pigments, in the form of physical admixtures, or the use of inorganic oxides with contaminating amounts of other "doping" oxides to function as photochromic oxides have become well known in the art. However, we have discovered a novel process wherein novel photochromic materials are produced by reacting two major oxide components to form an entirely new reaction product or entity which is not a mere physical admixture. These new reaction products function with surprising superiority to the photochromic metal oxide materials of the prior art in that they undergo a marked and rapid color change when subjected to ultraviolet radiation and revert to their original color in darkness or white light, said reversion being aided by the application of heat.

It is an object of the instant invention to present a novel process for the production of photochromic oxides.

It is a further object of the instant invention to present a novel process for the production of photochromic inorganic oxides wherein various primary metal oxides are reacted with secondary or activating metal oxides, halides, sulfates or nitrates and the products produced thereby.

It is a further object of the instant invention to present a novel process for the production of photochromic inorganic oxides which comprises (1) reacting an aqueous alkaline solution of a compound having the formula $YO_3$ or $X_2YO_4$ wherein Y is Mo or W and X is an alkali metal, or $NH_4^+$, with (2) a halide, oxide, hydrous oxide, sulfate or nitrate of Ti, Ge, Nb, Zr, Sn, Ce or Zn, in water, at pH of less than 7.0 and at a temperature ranging from about 50° C. to 100° C. and recovering the resultant reaction product.

It is a further object of the present invention to present novel photochromic two component reaction products of inorganic oxides.

These and other objects will become more apparent to those skilled in the art upon reading the more detailed description set forth hereinbelow.

As mentioned above, the first step of our novel process is to react an aqueous, alkaline solution of a compound represented by Formulae I or II, above with a second metal compound. These aqueous, alkaline solutions are produced by merely adding the oxide to water to which resultant solution is then added a basic compound such as NaOH, KOH, $NH_4OH$, and the like.

Compounds which may be used for this purpose, and are therefore represented by Formulae I or II, above, include $MoO_3$, $WO_3$, $(NH_4)_2MoO_4$, $(NH_4)_2WO_4$, $Li_2MoO_4$, $Na_2MoO_4$, $K_2MoO_4$, $Rb_2MoO_4$, $Cs_2MoO_4$, $Li_2WO_4$, $Na_2WO_4$, $K_2WO_4$, $Rb_2WO_4$, $Cs_2WO_4$ and the like.

To this aqueous, alkaline solution is then added an aqueous slurry or solution of metal halides, oxides, hydrous oxides, sulfates or nitrates which may comprise the second additive include $TiO_2$, $TiCl_4$, $TiBr_4$, $TiI_4$, $TiF_4$, $Ti(SO_4)_2$, $Ti(NO_3)_4$, $TiO_2 \cdot$hydrolysate, $GeO_2$, $GeCl_4$, $GeBr_4$, $GeI_4$, $GeF_4$, $Ge(SO_4)_2$, $Ge(NO_3)_4$, $GeO_2 \cdot$hydrolysate, $Nb_2O_5$, $NbCl_5$, $NbBr_5$, $NbI_5$, $NbF_5$, $Nb_2(SO_4)_5$, $Nb(NO_3)_5$, $Nb_2O_5 \cdot$hydrolysate, $ZrO_2, ZrCl_4$, $ZrBr_4$, $ZrI_4$, $ZrF_4$, $Zr(SO_4)_2$, $Zr(NO_3)_4$, $ZrO_2 \cdot$hydrolysate, $SnO_2$, $SnCl_4$, $SnBr_4$, $SnI_4$, $SnF_4$, $Sn(SO_4)_2$, $Sn(NO_3)_4$, $SnO_2 \cdot$hydrolysate, $SnO$, $SnCl_2$, $SnBr_2$, $SnI_2$, $SnF_2$, $SnSO_4$, $Sn(NO_3)_2$, $SnO \cdot$hydrolysate, $ZnO$, $ZnCl_2$, $ZnBr_2$, $ZnI_2$, $ZnF_2$, $ZnSO_4$, $Zn(NO_3)_2$, $ZnO \cdot$hydrolysate, $Ce_2O_3$, $CeCl_3$, $CeBr_3$, $CeI_3$, $CeF_3$, $Ce_2(SO_4)_3$, $Ce(NO_3)_3$, $Ce_2O_3 \cdot$hydrolysate, $CeO_2$, $CeCl_4$, $CeBr_4$, $CeI_4$, $CeF_4$, $Ce(SO_4)_2$, $Ce(No_3)_4$, $CeO_2 \cdot$hydrolysate and the like.

The reaction components may be reacted as added; however, it is advantageous to aid the reaction thereof by agitating the components during the addition and reaction thereof to and with each other. Any convenient means may be used for this purpose such as magnetic or paddle-type stirrers and the like.

The two components are reacted in a molar ratio of 4 to 20 moles of the Mo or W component to 1 mole of the metal compound. Preferred amounts range from about 6 moles to 12 moles of the Mo or W oxide component to about 1 mole of the metal component.

The resulting solution, comprising the above mentioned components, is then acidified, if necessary, to lower the pH of the solution media to less than about 7.0. Any inorganic acid may be used for this purpose with such compounds as hydrochloric acid, sulfuric acid, nitric acid, and the like being exemplary.

The next step in our novel process is to heat the reaction media to a temperature ranging from about 50° C.

to about 100° C. with temperatures of from about 65° C. to about 85° C. being preferred. At temperatures much higher than 100° C. undesirable side effects such as discoloration due to the reduction of the oxides occur. Lower temperatures than those specified may be used; however, they are not practical since they cause unnecessary prolongation of the procedure.

The time of reaction is not critical and generally the reaction is allowed to continue for a period of time of at least one hour. Longer times may be used, however, and generally a product of greater homogenity and better photochromic properties can be obtained by conducting the reaction for from 2 to 24 hours, preferably 6 to 12 hours. Shorter reaction times result in products which are less photochromic and of a grainy, somewhat unattractive consistency.

The products produced by the process disclosed herein may be recovered by any known separation technique. Since they are produced in the form of solid precipitates, they are conveniently recovered by filtration, centrifugation, decantation, settling, etc. The recovered product in the form of a cake etc. is then washed free of any occluded acid (i.e. reaction media) with warm water and dried in air.

The novel products produced by the above-enumerated process also form part of the present invention. These products are photochromic and, as such, change color upon contact thereof with ultraviolet light and revert to their original color upon removal of the light source therefrom.

As mentioned above, molecules or complexes which undergo reversible photo-induced color changes are termed photochromic systems. That is to say, in the absence of activating radiation, the system has a single stable electronic configuration with a characteristic absorption spectrum. When the system is contacted with ultraviolet irradiation the absorption spectrum for the system changes drastically but when the irradiation source is removed the system reverts to its original state.

Photochromism has been observed in inorganic and organic compounds both in solution and solid state. Although the exact mechanism of color change varies markedly in each individual system, there are two processes which account for most types of photochromic phenomena. The first process is the alteration of the force field around the nucleus of a coordination compound by photoinitiated dissociation, liquid exchange, or isomerization. This alteration can lead to a marked change in the light absorption properties of a molecule.

The second fundamental photo-electronic mechanism generally considered as producing photochromism is electron delocalization. This mechanism is rapidly reversible in organic molecules and therefore usually produces no colored intermediate. However, in inorganic crystals, photoinitiated electron delocalization from an impurity can lead to a colored state in which the electron is either trapped by a crystal defect to form a color center or otherwise reacts with the crystal host to leave the system in a colored state.

There are three major factors which govern the behavior of a photochromic system.

A. Absorption of incident radiation

According to the quantum theory, each absorbed quantum creates one activated molecule and only absorbed radiation can produce a chemical change. Variables which control the number of photons absorbed include the concentration and extinction coefficient of the photochrome, the screening coefficients of other components of the system, and the wavelengths of the incident radiation.

B. Quantum yield

All excited molecules will not undergo transformation to the colored form, so that the quantum yield will generally be less than unity. Various deactivating processes which compete for the excited molecules include fluorescence, phosphorescence, permanent chemical change and thermal release.

C. The reverse reaction

In both the forward and reverse reactions, the concentration of the colored form is dependent on the intensity of the radiation, the kinetics of the reverse reactions, and temperature of the reactions. The kinetics for the reverse reaction will normally be controlling, however some reverse reactions are thermally sensitive and are accelerated by irradiation.

The terms "photochromic compound," "photochromic substance" or "photochromic material," as used in the instant disclosure, mean compounds, substances or materials which change their transmission or reflectance upon being subjected to ultraviolet or visible irradiation and subsequently revert to their original state upon subjection thereof to a different wavelength of radiation, or removal of the initial ultraviolet source.

The ability of various materials to change color and to then revert back to their original color is not a new phenomena. In fact, such compounds have been widely used in various ways, as described above. Generally these compounds change their color when exposed to ordinary sunlight and revert back to their original color upon removal thereof from the rays of the sun. Various other materials, however, change color only when subjected to a certain degree of irradiation, and as such, sunlight will not effect them. High intensity radiation, such as 10–25 cal./cm.$^2$/sec. or more is necessary in regard to these compounds, while sunlight (0.2 cal./cm.$^2$/sec.) will affect the former.

Superficially taken, it would appear that our new class of compounds are merely mechanical or physical mixtures of the two components employed. However, these novel, chemically prepared, coprecipitated materials are of extremely great photosensitivity in comparison to mere mixtures of their individual components and therefore cannot be mere physical admixtures. Electron micrographs and X-ray diffraction data clearly indicate that the crystalline matrix of the molybdenum or tungsten starting material has been completely altered and that therefore we have produced two-phase materials whose photochromic function is surprising and extremely greater than prior art photochromic oxides.

While not wishing to be bound by any particular theory, it is possible that these increased photochromic phenomena can be explained by reference to the possible state of our novel products, i.e. those of an interfacial electron transfer mechanism. Electron micrographs of $TiO_2 \cdot 12MoO_3$, for example, show two phases; one consisting of log-shaped crystals which have a morphology similar to $MoO_3$ and sublime at an elevated temperature; and a second phase of smaller particle size which is believed to be $TiO_2$. Taken as such, these results suggest that the reaction of $MoO_3$ with $TiO_2$ gives only a physical mixture. Contrary to this, however, is the fact that the material is extremely photochromic. Mechanically ground, milled or water-slurried direct admixtures of $MoO_3$ or $WO_3$ with $TiO_2$, $ZnO$, $ZrO_2$, etc., however, are found not to possess this photochromic nature even after calcination. Furthermore, when only $MoO_3$ or $WO_3$ is dissolved in strong aqueous alkaline solutions and precipitated, i.e., following the noval procedure set forth hereinabove, there is no apparent difference in photocoloration over that observable for anhydrous $MoO_3$ or $WO_3$, each of which turn a very faint blue and faint blue green, respectively, after several hours of intense ultraviolet radiation. A graphic illustration of these differences in color change with time are set out in the figure.

In the figure a plot is made of various compositions produced according to the process of the present invention and other known prior art techniques. In each instance the degree of color change of various $TiO_2/MoO_3$ systems after ultraviolet light irradiation was plotted against the lengths of time of irradiation, each plot being numerically numbered according to the following key.

(1) 1 mole of $TiO_2$ reacted[1] with 12 moles of $MoO_3$
(2) 1 mole of $TiO_2$ reacted[1] with 6 moles of $MoO_3$
(3) 1 mole of $TiO_2$ reacted[1] with 20 moles of $MoO_3$
(4) 1 mole of $TiO_2$ reacted[1] with 4 moles of $MoO_3$
(5) 1 mole of $TiO_2$ reacted[1] with 1 mole of $MoO_3$, 1 mole of $TiO_2$ reacted[1] with ¼ mole of $MoO_3$ and 1 mole of $TiO_2$ reacted[1] with 24 moles of $MoO_3$
(6) 1 mole of $TiO_2$ ground and heated to 200° C. with 12 moles of $MoO_3$
(7) $MoO_3$ reacted[1] in absence of $TiO_2$
(8) Anhydrous $MoO_3$ alone
(9) 1 mole of $TiO_2$ ground physically with 6 moles of $MoO_3$.

[1] According to the process of the instant invention.

In view of this data, it is our theory, again not wishing to be bound thereby, that, since the electron micrographs also show a large portion of the smaller particle size phase attached to the boundries of the log-shaped crystals, sites for the following reaction are present;

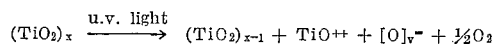

$$(TiO_2)_x \xrightarrow{u.v.\ light} (TiO_2)_{x-1} + TiO^{++} + [O]_v^- + \tfrac{1}{2}O_2$$

wherein [O] is an unionized oxygen vacancy, followed by the interfacial reaction

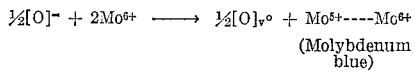

$$\tfrac{1}{2}[O]^- + 2Mo^{6+} \longrightarrow \tfrac{1}{2}[O]_v^\circ + Mo^{5+}\text{----}Mo^{6+}$$
(Molybdenum blue)

with the net reaction,

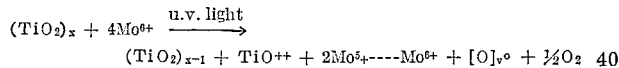

$$(TiO_2)_x + 4Mo^{6+} \xrightarrow{u.v.\ light} (TiO_2)_{x-1} + TiO^{++} + 2Mo^{5+}\text{----}Mo^{6+} + [O]_v^\circ + \tfrac{1}{2}O_2$$

The stoichiometry of this mechanism is supported by the observation that the most photochromic compounds in the series are $(TiO_2 \cdot xMoO_3)$ wherein $4 < x < 20$.

Further proof that the reaction involved is an interfacial one and not within one phase is gleaned from the fact that X-ray measurements on the blank $MoO_3$ compound give an identical diffraction pattern to the two-phase material produced by reacting one mole of $TiO_2$ with twelves moles of $MoO_3$ yet shows no significant coloration (see curve 7 of FIGURE 1). This common diffraction pattern is unique and different from anhydrous $MoO_3$ or its simple hydrates.

The compounds of the present invention have many uses well recognized by those skilled in the art. Among those most practical are variable reflectance devices for ultraviolet radiation, i.e. where the novel compounds of our invention are used as additives to various resins, i.e. acrylate and methacrylate polymers, poly(styrenes), poly(vinylhalides), aminoplast resins, polyester, and cyanoethylated cellulosic materials which may be treated to form sheets, films, castings, moldings, etc. which are useful as skylights, window panes, temporary photographic proofs, toys, advertising articles, costume jewelry, wall panels, building materials and the like.

The following examples are set forth for purposes of illustration only and are not to be considered as limitations on the present invention except as set forth in the appended claims.

EXAMPLE 1

To a suitable reaction vessel equipped with a stirrer and thermometer, are added 12 moles of a basic aqueous solution of $MoO_3$ produced with 15 moles of NaOH and water. To this solution is added 1 mole of a slurry of $TiO_2$. The pH of the resultant reaction mixture is adjusted to 5.0 by the addition of hydrochloric acid and the temperature of the reaction media is then raised to and maintained at 70° C. for 16 hours. White particles slowly begin to precipitate and after 16 hours the product is recovered by filtration. The filter cake is washed three times with warm water (at 40° C.) and dried in air at 20° C. A yield of 95% is obtained. Upon irradiation of the white, powdery product with ultraviolet light, it turns a very deep blue.

EXAMPLE 2

To a suitable reaction vessel, equipped as in Example 1, is added 6 moles of $WO_3$ in an aqueous alkaline solution of water and KOH. One mole of $TiCl_4$ is then added thereto as an aqueous solution. The pH of the resultant mixture is 6.5 and this mixture is then heated to 75° C. for 12 hours. A pale yellow powdery precipitate forms and is recovered by filtration, washed with warm water and dried in air, as in Example 1. A yield of 90% is obtained. The pale yellow powder turns deep blue-green when subjected to ultraviolet light of 390 m$\mu$ wavelength.

EXAMPLE 3

To a reaction vessel, equipped as in Example 1 is added an aqueous solution of 12 moles of $(NH_4)_2MoO_4$, made alkaline with 15 moles of KOH. One mole of $GeO_2$ is then added and the resultant mixture is adjusted to a pH of 4.7 with nitric acid. The mixture is agitated and heated to 68° C. for 17 hours. A white precipitate forms and is recovered by filtration, washed with warm water and dried. A yield of 90% is obtained. Upon contact thereof with ultraviolet light, the powder turns blue in about one minute.

EXAMPLE 4

Twenty moles of $Na_2WO_4$, in an aqueous alkaline solution of NaOH, are added to a suitable reaction vessel equipped as in Example 1. One mole of $ZrBr_4$ in water is then added and the resultant mixture is adjusted to a pH of 6.7 with sulfuric acid. The mixture is heated, with agitation, to 78° C. for 8 hours and a white precipitate is recovered by filtration, washed with warm water and dried to give a yield of 93%. When subjected to ultraviolet light for about 5 minutes the powder turns blue-green.

EXAMPLE 5

To a reaction vessel, equipped as in Example 1, is added 6 moles of $MoO_3$ in an aqueous alkaline solution of NaOH. One mole of $Ce(NO_3)_4$ in water is then added and the resultant mixture is adjusted to a pH of 6.0 with $HNO_3$. This mixture is then heated with agitation to 70° C. for 15 hours. A white precipitate forms and is recovered by filtration, washed with warm water and dried. A yield of 90% is obtained. Upon irradiation with ultraviolet light the powder turns deep blue.

EXAMPLE 6

To a reaction vessel, equipped as in Example 1, is added 12 moles of $MoO_3$ in an aqueous alkaline solution of KOH. One mole of $ZnSO_4$ in water is then added and the resultant mixture is adjusted to a pH of 6.7 with $H_2SO_4$. This mixture is heated with agitation to 68° C. for 18 hours. A white precipitate is formed and recovered by filtration, washed with warm water and dried. A yield of 96% is obtained. Upon irradiation with ultraviolet light the powder turns blue.

EXAMPLE 7

To a reaction vessel, equipped as in Example 1, is added 12 moles of $MoO_3$, in an aqueous alkaline solution of NaOH. One mole of $ZrO_2 \cdot$hydrolysate in water is then added and the resultant mixture is adjusted to a pH of 6.5 with HCl. This mixture is heated with agitation to 70° C. for 12 hours. A white precipitate forms and is recovered by filtration, washed with warm water and dried. A yield of 93% is obtained. Upon irradiation with ultraviolet light the powder turns deep blue.

TABLE I.—EXAMPLES OF SECONDARY ACTIVATING METAL OXIDES FOR USE WITH $MoO_3$ OR $WO_3$

| Primary Metal Oxide | Mole Ratio | Secondary Metal Compound [1] | Product Appearance | U.V. Irradiation Induced Color [2] | | Bleaching Reaction [2] (After 30 min. irradiation) | |
|---|---|---|---|---|---|---|---|
| | | | | In <1 minute | In 30 minutes | At Room Temp. | At 100–200° C. |
| $MoO_3$ | 12:1 | $TiO_2$ | Off-white powder | Blue | Deep blue | >1 month | <1 hour. |
| $MoO_3$ | 6:1 | $Ti(SO_4)_2$ | ----do---- | ----do---- | ----do---- | ----do---- | ----Do. |
| $(NH_4)_2MoO_4$ | 4:1 | $TiO_2$ | ----do---- | Faint blue | Blue | ----do---- | Do. |
| $MoO_3$ | 1:1 | $TiO_2$ | ----do---- | | Faint blue | ----do---- | Do. |
| $MoO_3$ | 12:1 | $GeO_2$ | ----do---- | Faint blue | Blue | ----do---- | Do. |
| $WO_3$ | 12:1 | $TiBr_4$ | Pale yellow powder | Blue-green | Deep blue-green | 3–5 hours | Do. |
| $WO_3$ | 6:1 | $TiO_2$ | ----do---- | ----do---- | ----do---- | ----do---- | Do. |
| $(NH_4)WO_4$ | 4:1 | $TiO_2$ | ----do---- | | Faint blue-green | ----do---- | Do. |
| $WO_3$ | 1:1 | $TiO_2$ | ----do---- | | ----do---- | ----do---- | Do. |
| $WO_3$ | 12:1 | $NbCl_5$ | ----do---- | Faint blue-green | Blue-green | ----do---- | Do. |
| $WO_3$ | 12:1 | $ZrO_2$ | ----do---- | ----do---- | ----do---- | ----do---- | Do. |
| $(NH_4)WO_4$ | 12:1 | $GeO_2$ | ----do---- | Blue-green | Deep blue-green | ----do---- | Do. |
| $WO_3$ | 12:1 | $SmO_2$ | ----do---- | Faint blue-green | Blue-green | ----do---- | Do. |
| $WO_3$ | 12:1 | $Zn(NO_3)$ | ----do---- | ----do---- | ----do---- | ----do---- | Do. |
| $WO_3$ | 12:1 | $CeO_2$ [3] | ----do---- | Blue-green | Deep blue-green | ----do---- | Do. |

[1] The anatase form of $TiO_2$ was found to be more effective than rutile or mixtures of anatase and rutile as the secondary metal oxides. For example, 1 mole of $TiO_2$ (pure rutile) reacted with 12 moles of $MoO_3$ gave a product which was only faint blue after 30 minutes u.v. irradiation.

[2] The irradiation and bleaching cycle could be repeated dozens of times with fatigue.
[3] Hydrolysate.

What is claimed is:
1. A process for the production of photochromic inorganic materials which comprises reacting (I) an aqueous alkaline solution of a compound selected from the group consisting of (1) those having the formula

$$YO_3$$

wherein Y is selected from the group consisting of molybdenum and tungsten and (2) those having the formula $$X_2YO_4$$

wherein Y is as defined above and X is selected from the group consisting of (a) an alkali metal, and (b) $NH_4^+$ with (II) a compound selected from the group consisting of the halides, oxides, hydrous oxides, sulfates, and nitrates of a metal selected from the group consisting of Ti, Ge, Ce, Nb, Zr, Sn and Zn, in water, the reaction being carried out at a temperature ranging from about 50° C. to about 100° C. and at a pH of less than about 7.0 and in a mole ratio of 20 to 4:1, respectively, recovering the resultant product.

2. Product produced by the process of claim 1.
3. A process for the production of photochromic inorganic materials which comprises reacting (I) an aqueous alkaline solution of a compound having the formula $$YO_3$$

wherein Y is selected from the group consisting of molybdenum and tungsten with (II) a compound selected from the group consisting of the halides, oxides, hydrous oxides, sulfates, and nitrates of a metal selected from the group consisting of Ti, Ge, Nb, Zr, Sn, Ce and Zn, in water, the reaction being carried out at a temperature ranging from about 50° C. to about 100° C. and at a pH of less than about 7.0 and in a mole ratio of 20 to 4:1, respectively, recovering the resultant product.

4. A process for the production of photochromic inorganic materials which comprises reacting (I) an aqueous alkaline solution of a compound having the formula $$X_2YO_4$$

wherein Y is selected from the group consisting of molybdenum and tungsten and X is selected from the group consisting of (a) an alkali metal, and (b) $NH_4^+$ with (II) a compound selected from the group consisting of the halides, oxides, hydrous oxides, sulfates, and nitrates of a metal selected from the group consisting of Ti, Ge, Ce, Nb, Zr, Sn and Zn, in water, the reaction being carried out at a temperature ranging from about 50° C. to about 100° C. and at a pH of less than about 7.0 and in a mole ratio of 20 to 4:1, respectively, recovering the resultant product.

5. Process according to claim 1 wherein Y is molybdenum.

6. Process according to claim 1 wherein Y is molybdenum, X is sodium and compound (II) is $TiO_2$.

References Cited
UNITED STATES PATENTS
3,214,283   10/1965   Chopoorian _____ 252—301.5 X

OTHER REFERENCES
Brown et al.: Reviews of Pure & Applied Chemistry (Australia), vol. 11, No. 1, March 1961, pages 2 to 32 (pages 8, 9 and 24–26 of particular interest).

Mellor: A Comprehensive Treatise on Inorganic and Theoretical Chemistry, vol. 11, Longmans, Green & Co., New York, 1931, pages 562, 563, 565 to 567, 569 and 789 to 792.

OSCAR R. VERTIZ, *Primary Examiner.*

H. T. CARTER, *Assistant Examiner.*